No. 830,404. PATENTED SEPT. 4, 1906.
E. & B. D. BARNES.
FISHING DEVICE.
APPLICATION FILED FEB. 24, 1906.

Witnesses
Frank Hough
C. C. Hines

Inventors
E. Barnes.
B. D. Barnes.
By Victor J. Evans.
Attorney

UNITED STATES PATENT OFFICE.

EDWIN BARNES AND BARNEY DACK BARNES, OF CORSICANA, TEXAS.

FISHING DEVICE.

No. 830,404.	Specification of Letters Patent.	Patented Sept. 4, 1906.

Application filed February 24, 1906. Serial No. 302,747.

*To all whom it may concern:*

Be it known that we, EDWIN BARNES and BARNEY DACK BARNES, citizens of the United States of America, residing at Corsicana, in the county of Navarro and State of Texas, have invented new and useful Improvements in Fishing Devices, of which the following is a specification.

This invention relates to improvements in fishing devices, and particularly to artificial bait for surface or deep-water trolling, the object of the invention being to provide a simple and effective construction of fishing device of this character having a revoluble body or tube peculiarly constructed to provide spiral flanges or portions adapted to be acted upon by the water as the trolling device is manipulated therein to impart revoluble motion to said body and adapt it to form an effective lure.

A further object is to provide a construction whereby the body may be easily and conveniently formed from wood and rapidly manufactured by woodworking appliances in common use, thus cheapening the cost of production over devices of the kind heretofore employed.

A still further object is to provide a novel mode of mounting the revoluble body so as to adapt it at all times to have free revoluble movement and prevent excessive wear thereon.

Figure 1:
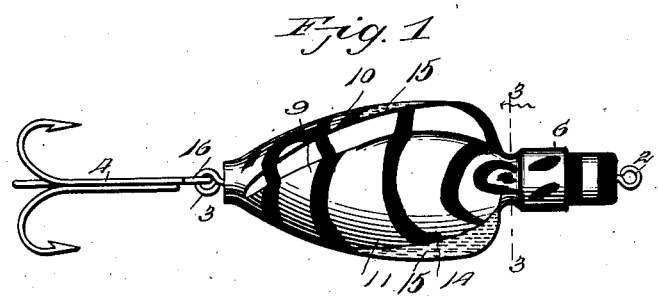
Figure 2:
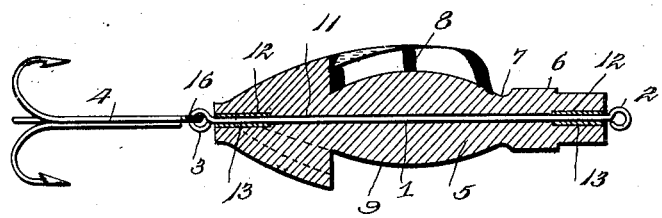
Figure 3:
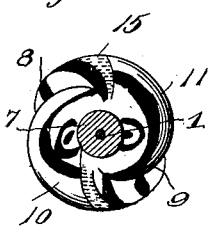

In the accompanying drawings, Figure 1 is a side elevation of a trolling device embodying our invention. Fig. 2 is a longitudinal section thereof. Fig. 3 is a cross-section on the line 3 3 of Fig. 1.

Referring now more particularly to the drawings, the numeral 1 designates a supporting-rod provided at its ends with eyes 2 and 3 for the respective attachment of the line and the usual gang of hooks 4 thereto. Arranged to revolve upon the rod between the eyes 2 and 3 is a revoluble body 5, preferably formed of wood and substantially of pear form, the enlarged forward end of said body being provided with a neck or elongated portion 6 and a groove or concavity 7. Said body 5 is cut away on opposite sides to form reduced central faces 8 and 9 and corresponding intermediate enlargements 10 and 11, the outer edge of the said enlargements forming reversely-projecting spiral flanges, serving as blades for the water to impinge against, whereby rotary motion will be communicated to the body upon the same being drawn or trolled through the water. The groove 7 forms an entrance-space communicating with the grooves between the walls of the flanges and the reduced portions to permit the water to have free passage therethrough and prevent the formation of any cross-currents, which would tend to prevent free rotary motion of the body.

The formation of the body is such as to adapt it to be readily made of wood or other similar cheap material and turned on a lathe or other woodworking-tool, thus cheapening the process of manufacture over similar devices constructed of metal or having a continuous spiral groove or applied spiral flanges. The bore 11 of the body, through which the rod 1 extends, is provided at its ends with counterbores or recesses 12, receiving metallic bearing tubes or sleeves 13, which contact with the rod, and thus form bearings for the body, which bearings hold the body properly centered upon the rod and relieve the same from the wear and excessive friction which would be produced if the walls of the bore 11 contacted throughout their length with the rod.

In practice the body 5 is varnished or coated with a waterproof paint and striped in a dark color or colors, as indicated at 14, to impart an attractive appearance thereto, and the outer faces of the flanges provided with a longitudinal strip 15 of tin-foil or with a stripe of white or silvery shade, so that as the said body revolves in the water the surface thereof will present the effect of a quickly appearing and disappearing flash or streak of silvery white and stripes in alternation, thus simulating the action of a live bait rapidly swimming in the water, and consequently providing an attractive lure.

The reduced neck portion 6 increases the effective bearing length of the body on the rod 1 and provides a portion for the formation of the groove 7 to facilitate the division of the water and its passage to the spiral flanges, so that an ease of action will be secured to cause the body to revolve at a highly rapid speed.

The hooks 4 are preferably mounted upon a common shank having an eye 16 to pivotally engage the eye 3, thus permitting the hooks to have a pivotal action to reduce resistance to the movement of the device through the water and the liability of the escape of the fish when a strike is made. Live bait may be used on the hooks, if desired.

Having thus described the invention, what is claimed as new is—

1. A trolling device comprising a support carrying one or more hooks and having a pear-shaped body revolubly mounted, said body being provided at its enlarged end with an elongated neck having a surrounding groove and formed in rear of said groove with concavities providing a pair of reversely-extending spiral propelling-flanges, the spaces between said flanges communicating at their forward ends with said groove.

2. In a trolling device, a supporting-rod, and a revoluble body mounted thereon, said body being cut away at opposite sides to provide alternately-arranged reduced and enlarged portions, the edges of the enlarged portions forming a pair of reversely-extending propelling-flanges.

3. In a trolling device, a supporting-rod provided with terminal eyes, hooks connected with one of the eyes, a body revolubly mounted upon the rod between the eyes, said body being cut away to provide spiral propelling-flanges and having a bore for the passage of the rod, said bore being formed with enlargements at its ends, and bearing-sleeves inserted in said enlargements and engaging the rod.

In testimony whereof we affix our signatures in presence of two witnesses.

EDWIN BARNES.
BARNEY DACK BARNES.

Witnesses:
E. OLIN CALL,
M. M. RAY.